United States Patent
Ishii et al.

(10) Patent No.: US 11,334,361 B2
(45) Date of Patent: May 17, 2022

(54) SHARED POINTER FOR LOCAL HISTORY RECORDS USED BY PREDICTION CIRCUITRY

(71) Applicant: Arm Limited, Cambridge (GB)

(72) Inventors: Yasuo Ishii, Austin, TX (US); Joseph Michael Pusdesris, Austin, TX (US); Muhammad Umar Farooq, Austin, TX (US)

(73) Assignee: Arm Limited, Cambridge (GB)

( * ) Notice: Subject to any disclaimer, the term of this patent is extended or adjusted under 35 U.S.C. 154(b) by 271 days.

(21) Appl. No.: 16/806,063

(22) Filed: Mar. 2, 2020

(65) Prior Publication Data

US 2021/0271486 A1 Sep. 2, 2021

(51) Int. Cl.
  *G06F 9/38* (2018.01)
  *G06F 9/50* (2006.01)
  *G06F 9/30* (2018.01)

(52) U.S. Cl.
  CPC ........ *G06F 9/3844* (2013.01); *G06F 9/30145* (2013.01); *G06F 9/3806* (2013.01); *G06F 9/3832* (2013.01); *G06F 9/3861* (2013.01); *G06F 9/5038* (2013.01)

(58) Field of Classification Search
  CPC .... G06F 9/3844; G06F 9/3861; G06F 9/3806; G06F 9/3832
  See application file for complete search history.

(56) References Cited

U.S. PATENT DOCUMENTS

| | | | |
|---|---|---|---|
| 5,864,697 A * | 1/1999 | Shiell | G06F 9/3848 712/240 |
| 6,006,317 A | 12/1999 | Ramagopal | |
| 6,151,672 A * | 11/2000 | Hunt | G06F 9/3846 712/233 |
| 6,272,623 B1 * | 8/2001 | Talcott | G06F 9/3806 712/239 |

(Continued)

OTHER PUBLICATIONS

Soundararajan, Niranjan, et al. "Towards the adoption of local branch predictors in modern out-of-order superscalar processors." Proceedings of the 52nd Annual IEEE/ACM International Symposium on Microarchitecture.pp. 519-530 (Year: 2019).*

(Continued)

*Primary Examiner* — Jyoti Mehta
*Assistant Examiner* — Kasim Alli
(74) *Attorney, Agent, or Firm* — Nixon & Vanderhye P.C.

(57) ABSTRACT

An apparatus has processing circuitry, and history storage circuitry to store local history records. Each local history record corresponds to a respective subset of instruction addresses and tracks a sequence of observed instruction behaviour observed for successive instances of instructions having addresses in that subset. Pointer storage circuitry to store a shared pointer shared between the local history records. The shared pointer indicates a common storage position reached in each local history record. Prediction circuitry determines predicted instruction behaviour for a given instruction address based on a selected portion of a selected local history record stored in the history storage circuitry. The prediction circuitry selects the selected local history record based on the given instruction address and selects the selected portion based on the shared pointer.

20 Claims, 6 Drawing Sheets

(56) References Cited

U.S. PATENT DOCUMENTS

| | | | |
|---|---|---|---|
| 6,694,425 B1 | 2/2004 | Eickemeyer | |
| 6,738,897 B1 * | 5/2004 | Talcott | G06F 9/3848 712/239 |
| 10,846,097 B2 | 11/2020 | Jumani | |
| 2004/0255104 A1 | 12/2004 | Akkary | |
| 2005/0138480 A1 | 6/2005 | Srinivasan | |
| 2016/0350116 A1 | 12/2016 | Reddy | |

OTHER PUBLICATIONS

Notice of Allowance dated Dec. 30, 2020 for U.S. Appl. No. 16/752,995, 11 pages.
O. Mutlu et al, "On Reusing the Results of Pre-Executed Instructions in a Runahead Execution Processor" *IEEE Computer Architecture Letters*, vol. 4, Posted Jan. 30, 2006, 4 pages.
H. Akkary et al., "Recycling Waste: Exploiting Wrong-Path Execution to Improve Branch Prediction" *ICS'03*, Jun. 23-26, 2003, pp. 12-21.
Office Action dated Feb. 2, 2021 for U.S. Appl. No. 16/891,431, 9 pages.
U.S. Appl. No. 16/752,995, filed Jan. 27, 2020, Puspesris et al.
U.S. Appl. No. 16/891,431, filed Jun. 3, 2020, Ishii et al.

\* cited by examiner

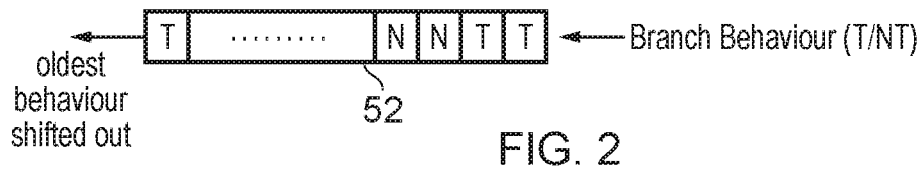

FIG. 2

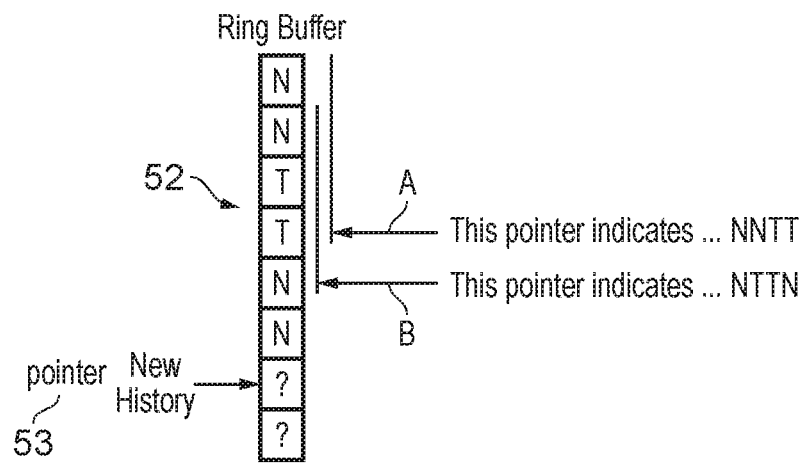

FIG. 3

```
foreach (entry) {
    if (entry satisfy condition) {
    // e.g., entry.PC == hash(PC)
        entry.history <<= 1;
        entry.history |= T/NT;
    }
}
```

Local history

| PC1 | TTNNTTTT |
| PC2 | NNTTNTTN |

54

Recovery pointer is needed for all entries

FIG. 4

```
foreach (entry) {
    if (backward taken branch) {
        entry.history <<= 1;
    }
    if (entry satisfy condition) {
        entry.history |= T/NT;
    }
}
```

44

| PC1 | TTNNTTTT | ← 64
| PC2 | NNTTNTTN | ← 64

Each entry will be shifted by one at backward branches

FIG. 5

SHARED POINTER FOR LOCAL HISTORY RECORDS USED BY PREDICTION CIRCUITRY

BACKGROUND

Technical Field

The present technique relates to the field of data processing. More particularly, it relates to prediction circuitry for determining predicted instruction behaviour.

Technical Background

A data processing apparatus may have prediction circuitry for determining predicted instruction behaviour for instructions to be processed by the processing circuitry, before the actual instruction behaviour is known. The predicted instruction behaviour can be used to control speculative processing of subsequent instructions earlier than if those instructions had to wait for the actual instruction behaviour of the earlier instruction to be determined. This can help to improve processing performance. For example, the predicted instruction behaviour could be a predicted outcome or target address of a branch instruction, a predicted target address of a load operation to load data from memory, or a predicted data value expected to be loaded from memory in such a load operation.

SUMMARY

At least some examples provide an apparatus comprising: processing circuitry to perform data processing in response to instructions; history storage circuitry to store a plurality of local history records, each local history record corresponding to a respective subset of instruction addresses and tracking a sequence of observed instruction behaviour observed for successive instances of instructions having instruction addresses in that subset; pointer storage circuitry to store a shared pointer shared between said plurality of local history records, the shared pointer indicative of a common storage position reached in each of the local history records; and prediction circuitry to determine predicted instruction behaviour for a given instruction address based on a selected portion of a selected local history record stored in the history storage circuitry; where the prediction circuitry is configured to select the selected local history record based on the given instruction address and to select the selected portion based on the shared pointer.

At least some examples provide an apparatus comprising: means for performing data processing in response to instructions; means for storing a plurality of local history records, each local history record corresponding to a respective subset of instruction addresses and tracking a sequence of observed instruction behaviour observed for successive instances of instructions having instruction addresses in that subset; means for storing a shared pointer shared between said plurality of local history records, the shared pointer indicative of a common storage position reached in each of the local history records; and means for determining predicted instruction behaviour for a given instruction address based on a selected portion of a selected local history record stored in the means for storing the plurality of local history records; where the means for determining is configured to select the selected local history record based on the given instruction address and to select the selected portion based on the shared pointer.

At least some examples provide a method comprising: performing data processing in response to instructions; tracking observed instruction behaviour in a plurality of local history records, each local history record corresponding to a respective subset of instruction addresses and tracking a sequence of observed instruction behaviour observed for successive instances of instructions having instruction addresses in that subset; storing a shared pointer shared between said plurality of local history records, the shared pointer indicative of a common storage position reached in each of the local history records; and determining predicted instruction behaviour for a given instruction address based on a selected portion of a selected local history record stored in the history storage circuitry; where the selected local history record is selected based on the given instruction address, and the selected portion is selected based on the shared pointer.

Further aspects, features and advantages of the present technique will be apparent from the following description of examples, which is to be read in conjunction with the accompanying drawings.

BRIEF DESCRIPTION OF THE DRAWINGS

FIG. 2 shows a logical view of a global history record that can be used for some forms of prediction mechanism;

FIG. 3 shows an example of a hardware implementation of the global history record;

FIG. 4 shows a logical view of a number of local history records which track history information based on sequences of observed instruction behaviour for respective subsets of instruction addresses;

FIG. 5 shows an example of a logical view of local history records for which advancement of a shared pointer is controlled in common;

DESCRIPTION OF EXAMPLES

Figure 1:
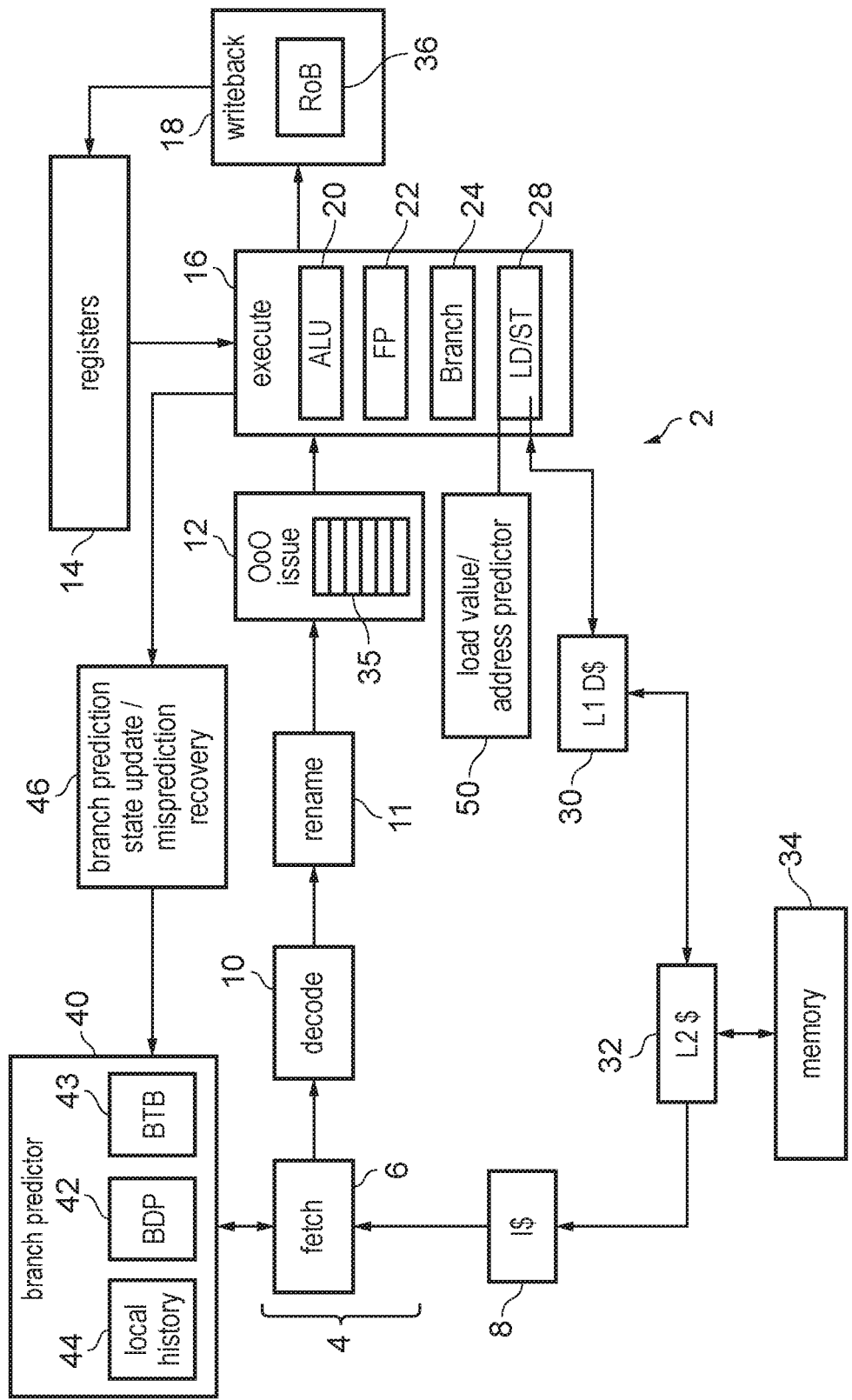
FIG. 1 schematically illustrates an example of a data processing apparatus having at least one prediction mechanism.

An apparatus has processing circuitry to perform data processing in response to instructions, and prediction circuitry to determine predicted instruction behaviour for a given instruction address. The prediction circuitry bases the prediction on a number of local history records stored in history storage circuitry. Each local history record corresponds to a respective subset of instruction addresses, and tracks a sequence of observed instruction behaviour observed for successive instances of instructions having instruction addresses in that subset. Pointer storage circuitry stores a shared pointer which is shared between the local history records, the shared pointer indicating a common storage position reached in each of the local history records. The prediction circuitry selects a selected local history record to be used for forming the prediction of the predicted instruction behaviour for one or more instructions at a given instruction address, with that selection being based on the given instruction address. The prediction is based on a selected portion of the selected local history record, where the prediction circuitry selects the selected portion based on the shared pointer. This approach can provide more accurate predictions compared to prediction circuitry using a global history record, but with a lower overhead for maintaining consistency of the history information stored in the local history records.

The prediction circuitry may aim to correlate previously observed instruction behaviour of executed instructions with a predicted behaviour for a particular instruction address. This helps to distinguish different routes to the same instruction address within a program flow, so that different alternative outcomes for the same instruction address can be distinguished based on the pattern of previous instruction behaviour observed running up to that instruction address. Most existing prediction mechanisms use a form of history record called a global history record, where the sequence of observed instruction behaviour seen for the most recent N instructions is tracked in a single record shared for all instruction addresses. An alternative is to use local history records which are dedicated to particular subsets of instruction addresses and each track a sequence of observed instruction behaviour observed for successive instructions having instruction addresses in the particular subset assigned to a particular local history record. By partitioning the history tracking into different subsets of instruction addresses, this can enable more accurate predictions because the behaviour seen for a given instruction address following a particular pattern of previous instruction behaviour may differ for one region of the address space compared to another. However, in practice, many commercial implementations of prediction circuitry may hesitate to use local history records because they may require some overhead in maintaining the history consistency which may require greater circuit area and power cost compared to global history records.

More particularly, as different subsets of instruction addresses may see different frequencies of events requiring history updates, one would expect that one local history record may be updated more often than another and so each local history record may be filled at different rates. Hence, one would expect that the position reached in a given local history record would need to be tracked by a dedicated pointer for that record, separate from other pointers used for the other local history records. However, this approach of maintaining a separate pointer for each local history record can impose a great cost in maintaining tracking information which enables incorrect updates of the local history records following a misprediction to be reversed to ensure that subsequent predictions are not based on observed instruction behaviour for mispredicted instructions. This high cost of restoring previous prediction state is a reason why very few commercial processors use the local history based approach.

With the technique discussed below, this cost can be reduced because a shared pointer is shared between two or more local history records, with a shared pointer indicating a common storage position reached in each of those local history records. This approach is counter-intuitive because one would expect that as different local history records may need to be filled at different rates then their pointers should be allowed to differ. However, in practice, the inventors recognise that sharing of a single pointer between the different history records is not a problem because even if one history record needs to be filled more often than another, it is not a problem to leave some entries of a given history record unfilled when the shared pointer is advanced because another local history record is being updated more frequently. By using a single shared pointer shared between multiple local history records, which can be used to select which portion of the history record to use to form a particular prediction, this greatly reduces the cost of implementing misprediction recovery, making it more feasible that a local history approach can be adopted in commercial processes without greatly increasing the circuit area and power cost, and hence enabling more accurate predictions than prediction mechanisms based only on global history.

For each local history record, the history information stored in that record may separately identify the observed instruction behaviour for two or more instances of instructions having instruction addresses in the corresponding subset of instruction addresses. Hence, the history record may comprise a series of separate fields each corresponding to a given instruction having an instruction address in the corresponding subset and indicating the corresponding observed instruction behaviour seen when that instruction was executed. This differs from a form of history state which increments or decrements a counter in response to seeing observed instruction behaviour of one type or another, but which does not individually identify the outcomes of particular instructions. The form of local history which separately tracks sequences of observed instruction behaviour of two or more instructions can be useful for identifying the path of program flow taken to reach a particular instruction address, so that different potential outcomes for the same instruction address expected following different routes into the same instruction can be predicted. The portion of the selected local history record used to form a prediction of a given instruction address may correspond to the portion which indicates the observed instruction behaviour seen for the most recent N instances of instructions having instruction addresses in that subset, where N is an integer chosen by the designer of the processing system.

The same shared pointer may be used to select the selected portion of the selected local history record, regardless of which particular local history record is selected as the selected local history record.

Front end circuitry may be provided to associate a supplied instruction supplied for processing by the processing circuitry with a tagged pointer which is determined based on the shared pointer stored in the pointer storage circuitry. This association of a supplied instruction with the tagged pointer could be provided in different ways. In one example the instruction may pass down a processing pipeline accompanied by the corresponding tagged pointer value, so that the tagged pointer can be identified when the instruction reaches the execute stage of the pipeline. Alternatively, rather than the pointer passing along the pipeline together with the instruction, instead the association between a particular instruction identifier identifying the supplied instruction and the corresponding tagged pointer value could be recorded in a separate storage structure, to reduce the size of the signal paths which convey the instruction down the pipeline itself. The front end circuitry may be one of the relatively early stages of the pipeline, such as a fetch stage or decode stage for example.

Misprediction recovery circuitry may be provided which responds to a misprediction detected for a given mispredicted instruction, to restore the shared pointer stored in the pointer storage circuitry to a value determined based on the tagged pointer associated with the given mispredicted instruction. By restoring the shared pointer based on the tagged pointer, this effectively reverses any changes made to the local history records since the mispredicted instruction was allocated the tagged pointer at the front end circuitry, so as to avoid observed instruction behaviour associated with incorrectly executed instructions being used to form subsequent predictions.

The use of a shared pointer shared between each of the local history records greatly reduces the cost of the instruction tagging and misprediction recovery compared to an approach where each local history record has its own pointer. If each local history record had its own pointer then the supplied instruction would need to be associated with multiple tagged pointer values to indicate how each separate local history record should be restored if a misprediction is detected for that instruction. This could lead to a high cost in terms of widening the channels for passing instructions in the pipeline or in implementing the storage structure for associating instruction Identifiers and pointers. For example if there are 16 local history records and a 6-bit pointer is provided for each local history record, then this would need 96 bits of extra state per instruction for tracking the positions within each of the local history records associated with that instruction so as to enable correct recovery on a misprediction. In contrast, with the shared pointer approach, a single pointer value can be tagged with the instruction, so that this may for example need 6 bits regardless of the number of local history records provided. It will be appreciated that the number of local history records and the number of bits for the pointer described above are just illustrative examples and other numbers of bits and numbers of history records could be provided.

In some implementations, the front end circuitry could also associate the supplied instruction with a local history tag indicating at least one piece of local history information obtained from at least one local history record other than the local history record associated with the subset of instruction addresses which includes the instruction address of the supplied instruction. For example, the local history tag could indicate the items of observed instruction behaviour stored in one or more of the other local history records at the position currently indicated by the shared pointer. Again, the association between the local history tag and an instruction can be maintained using tags flowing down the pipeline with the instruction, or using a separate storage structure, as described above for the tagged pointer. Although not essential, as well as indicating the history information from other local history records, local history information for the local history record that is associated with the subset of instruction addresses including the instruction address of the supplied instruction could also be indicated in the local history tag. By recording a local history tag in association with a given instruction, then when a misprediction occurs the misprediction recovery circuitry may use the local history tag associated with the mispredicted instruction to restore at least one piece of local history information to at least one local history record based on the local history tag. This can help to provide more precise recovery following a misprediction, which can help to improve prediction accuracy. The size of the local history tag can still be smaller than the combined size of multiple pointers if the instruction was tagged with separate pointers for each local history record, so the local history tagging does not negate the benefits of using a shared pointer to reduce the size of tagged information.

However, such tagging of a particular supplied instruction with tagged local history is not essential, as if this is not provided then when a misprediction occurs it may be sufficient just to restore the shared pointer based on the tagged pointer associated with a given misprediction instruction, but then to clear the entries at the storage positions indicated by the tagged pointer to some default value to avoid potentially incorrect information being used. While this may lose some of the correct information associated with updates of local history made between the time of the pointer advance event which caused the tagged pointer value to be set in the shared pointer and the time when the misprediction is detected for the subsequent mispredicted instruction, this may simply be an issue of prediction accuracy and hence performance rather than causing any incorrect results. Hence, the decision on whether or not to use local history tagging may be a decision for the designer of a particular processor microarchitecture, depending on the balance between performance and circuit area and power cost sought for that particular microarchitecture.

As well as being used for handling misprediction recovery, the tagged pointer associated with a given instruction can also be used for controlling updates of the local history information. In response to the processing circuitry determining observed instruction behaviour for an executed instruction satisfying at least one history updating condition, the prediction circuitry may update local history information at a target storage position within a target local history record based on the observed instruction behaviour for the executed instruction. The target local history record may be selected by the prediction circuitry based on the instruction address of the executed instruction. The target storage position may be selected by the prediction circuitry based on the tagged pointer associated with the executed instruction. The same tagged pointer is used to select the target storage position regardless of which local history record is selected as the target local history record to be updated.

In response to a pointer advance event, the prediction circuitry may advance the shared pointer stored in the pointer storage circuitry, to update the common storage position reached in each of the local history records. For example, when the pointer is advanced, the pointer may be incremented to point to the next location in the local history records. The local history records may be stored in the buffer implemented as a ring buffer, for which each pointer advance event causes the pointer to be updated to point to the next location, but if the shared pointer is already pointing to the final location in the ring buffer then a further pointer advance event causes the pointer to be sent back to the beginning of the buffer to indicate to the storage position.

As the pointer is shared between local history records, then when a pointer advance event occurs, the prediction circuitry may advance the shared pointer to advance the common storage position reached in a given local history record even if no observed instruction behaviour was allocated to that given local history record since a previous pointer advance event occurred. This approach may be seen as counterintuitive since it may seem a waste of storage space within the local history record to advance the pointer even if no observed instruction behaviour has been allocated to the record since the previous time the pointer was advanced, as this may be seen to waste an entry of the storage capacity. However, in practice this slightly less efficient utilisation of storage capacity may impose a much lower cost in terms of hardware implementation than an alternative approach using separate pointers for each of the different local history records, which may require a much greater circuit area and power cost for the tagging of the instructions with the current pointer values for each local history record to enable recovery on a misprediction.

A variety of events could be treated as a pointer advance event. In some systems an explicit instruction could be provided to instruct that the pointer should be advanced. However, one particularly useful form of pointer advance event may comprise an instance of detecting a backwards change of program flow indicative of a change of program flow from a first instruction to a second instruction having a lower instruction address than the first instruction. It may be desirable to reduce the chance that two separate instances of instructions having an instruction address in the same subset are encountered between two successive pointer advance events, as otherwise the observed behaviour for the second of these instructions may overwrite the observed behaviour for the first of the instructions. In previous prediction techniques based on global or local history, one would normally expect that the pointer marking the current storage position in the storage buffer should be incremented each time some history information is allocated to a history record, which by definition will ensure that it is not possible to see two different instructions which require an update of history between two successive pointer advance events. However when a shared pointer is shared between multiple history records, then it can no longer be guaranteed that there will be updates of history for each record at a common rate. The inventors have observed that, in order for two instances of an instruction at the same instruction address to be executed, there must have been a backwards change of program flow between the first instance and the second instance. Hence, by using a detected instance of a backwards change of program flow as the trigger for advancing the pointer, this reduces the likelihood that there will be more than one instance of needing to update a given local history record between successive pointer advance events.

Further factors which can help reduce the likelihood of overwriting the most recently allocated entry could be that the mapping of the instruction addresses onto the respective subsets for the different local history records may be chosen so that the addresses which alias onto the same local history record may be spread out at relatively separated regions of the address space to reduce the chance of seeing two updates to the same local history record between successive pointer advance events, and/or that not all instructions may need to update the history information (in some cases one or more history updating conditions may need to be satisfied). These can make it less likely that two instructions requiring updating of the same local history record are seen in short succession.

In any case, even if there were two successive updates of history information in the same local history record without having advanced the pointer in between, causing the most recently updated item of history to be overwritten prematurely, this would not cause any issue of incorrect processing but may simply be a performance issue caused by a prediction being made incorrectly or less accurately due to the lost history information. Nevertheless, such occurrences may be expected to be rare due to the choice of the backwards change of program flow as the pointer advance event.

Backwards program flow change detection circuitry may be provided to detect the backwards change of program flow. This detection may be based on comparing instruction addresses of the first instruction and the second instruction. For some implementations, the comparison of the instruction addresses of the first and second instructions may be a precise comparison including all meaningful bits of those instruction addresses. Note that in some processor architectures an address may include one or more least significant bits which always have the same value for each instruction address, e.g. because instructions occupy a certain storage size such as 2 or 4 bytes and those lowest address bits are indicative of different storage positions within an instruction rather than distinguishing different instructions. Hence, even in this full comparison approach it is not necessary to use such least significant bits for the comparison. Also, some processor architectures may represent addresses using stored values of a certain size, e.g. 64 bits, but a most significant portion of each address could always have the same value, for example the most significant 16 bits may always be zero leaving only 48 bits of meaningful addresses. This may be because while 64 bit addresses are provided to permit future expansion or because it is more convenient to implement storage in units of size corresponding to a power of 2 number of bits, in practice it may be considered unlikely that the full 64-bit address space may be needed and 48 bits of address space may be sufficient in some cases. Hence, again for backwards program flow change detection circuitry based on a full comparison of the instruction addresses of the first and second instructions, this may not require that most significant portion of the stored addresses to be compared as they do not provide meaningful information. Hence, in implementations which perform a full comparison of the instruction addresses (excluding any portions of the addresses which do not provide meaningful information) this may provide a precise comparison of the addresses to detect all backwards changes of program flow without permitting any false positives or false negatives.

However, in another implementation the backwards program flow change detection circuitry may detect the backwards change of program flow based on a partial comparison of corresponding portions of the instruction addresses of the first instruction and the second instruction, where the corresponding portions exclude most significant portions of the instruction addresses of the first and second instructions. This excluded most significant portion may include at least one meaningful bit of the instruction addresses (which can take different values for different instruction addresses) so is not merely an upper portion always set to the same value for all instruction addresses. This approach may be seen as counterintuitive as we would expect that if meaningful bits of the most significant portions of the instruction addresses are excluded from the comparison, then this could lead to instances of false negatives (when a backwards program flow change actually occurred, but the comparison identified that the corresponding portions of the addresses were increasing in value between the first and second instructions and so did not detect the backwards program flow change) or false positives (when no backwards program flow change occurred but the transition from the first instruction to the second instruction caused an overflow into the excluded most significant portion of the address, so that while the actual program flow change was a forwards program flow change, it is detected as a backwards program flow change by the backwards program flow change detection circuitry). One would think false negatives would be more a problem than false positives, as false negatives could cause incorrect overwriting of the history information in the buffer, but in practice this may be a very rare event and the slight performance reduction associated with occasional false negative detection of backwards program flow changes may be considered acceptable, to save the circuit area and power cost associated with the additional comparators for comparing the excluded most significant portions of the instruction addresses. In the vast majority of cases these portions of comparators associated with the most significant portions of the instruction addresses may burn power which may not be justified because the most significant portions of the instruction addresses change much less frequently between instructions than portions at less significant bit positions. Hence, providing less precise backwards program flow change detection circuitry which permits the occasional false positive or false negative by not performing a full comparison of the instruction addresses can in practice be tolerated and can help to provide lower hardware cost and lower power consumption.

Hence, it will be appreciated that the instance of detecting a backwards change of program flow could either be detecting an actual backwards change or be detecting an event which appears to be a backwards change of program flow but may actually be a forwards change of the program flow due to the use of a less precise detection mechanism.

The local history information at a given storage position in a given local history record may have one of a plurality of states. These states may include at least two observed instruction behaviour states for indicating different observed instruction behaviour. For example, for a branch prediction mechanism the observed instruction behaviour states could indicate a not taken state and a taken state respectively. For a load address prediction mechanism the different observed instruction behaviour states could indicate different stride values indicating the difference between the address observed for a current load instruction and the address observed for a previous load instruction.

However, in addition to the at least two observed instruction behaviour states, the plurality of states may also include an initialisation state which does not indicate a particular instruction behaviour, but rather is a default state set to a given storage position in a given local history record when the pointer advances to that given storage position. Hence, in response to the pointer advance event, the prediction circuitry may set the local history information at a next storage position in each of the local history records to the initialisation state. By providing an additional state for indicating that no update has been made to that storage position in the local history record since the most recent pointer advance event, this can improve prediction accuracy by distinguishing actual instruction behaviour from the default state set in an entry because the shared pointer advanced before that entry had been updated since a previous pointer advance event.

The local history records can be used in different ways to form the prediction using the prediction circuitry. In one example the prediction circuitry may have at least one prediction table which comprises a number of prediction state entries, separate from the history stored in the local history records. For example, the prediction table could indicate prediction counters which are incremented or decremented in response to instances of detecting an event of a particular type (e.g. incremented on a taken branch and decremented on a not taken branch), or could indicate weights used to form the prediction for some types of prediction mechanisms. Unlike the local history records, for the prediction table the corresponding prediction state entries may not separately identify the outcomes of two or more instructions used to update that prediction state entry.

The prediction circuitry may in some cases determine the predicted instruction behaviour based on the selected portion of the selected local history record, by using the selected portion of the selected local history record to select at least one selected prediction state entry from the at least one prediction table, and then determine the predicted instruction behaviour based on the at least one selected prediction state entry from the at least one prediction table. Hence, the local history record may not directly form the prediction of the predicted instruction behaviour, but is used to index into the prediction state entries of the at least one prediction table used to form the prediction.

However, in other implementations, it is possible, when a replay condition is satisfied for the given instruction address, to determine the predicted instruction behaviour for that address directly based on the selected portion of the selected local history record. This functionality may be provided in addition to the indexing into the one or more prediction tables as described in the previous paragraph (with the prediction based on the prediction table(s) being selected if the replay condition is not satisfied, and the prediction directly based on the selected portion of the selected local history record being selected if the replay condition is satisfied).

For example the replay condition may be satisfied when the prediction circuitry detects that the given instruction address represents a block of one or more instructions which includes a replayed instruction which is to be re-executed following detection of a misprediction associated with an earlier instruction than the replayed instruction, when the local history record associated with the subset of instruction addresses which includes the given instruction address includes an indication of the observed instruction behaviour observed when the replayed instruction was executed previously, prior to detection of the misprediction associated with the earlier instruction. This recognises that when a misprediction occurs, the instruction execution may already have executed a number of instructions past that misprediction instruction, and while any instructions which depend on the mispredicted instruction may be incorrect, the outcomes of some independent instructions may be correct regardless of the misprediction. Hence, when execution is wound back to the point of the misprediction and subsequent instructions are re-executed, there may be some replayed instructions which are at a point of program flow where program flow has already converged again (if it had separated based on the prediction), so that the same replayed instruction is executed again and may still have the same outcome as it did when the replayed instruction was executed the first time following the mispredicted instruction. It is recognised that at the point when the replayed instruction is encountered again, the observed instruction behaviour seen for that instruction the first time may still be present in the local history record for the corresponding subset of instruction addresses, and so can be used to directly determine the predicted instruction behaviour for the re-execution of the replayed instruction. The prediction based on the actually observed instruction behaviour for the first instance of executing the replayed instruction may often be more accurate than a prediction of the outcome of the replayed instruction based on the at least one prediction table which may be based on earlier instances of encountering the replayed instruction. Hence, by determining the predicted instruction behaviour directly based on the selected portion of the selected local history record when the replay condition is satisfied for the given instruction address, this can provide greater prediction accuracy. For example the prediction circuitry may, following a misprediction, maintain a record of instruction addresses of executed instructions which were independent of the mispredicted instruction, so that the replayed instruction satisfying a replay condition can be identified if one of those instructions is executed again.

The technique discussed above can be applied to different forms of prediction circuitry. In one example, the prediction circuitry may comprise branch prediction circuitry to predict, as the predicted instruction behaviour, a predicted branch outcome for a branch instruction. For example the branch outcome may be whether or not the branch instruction is to be taken or not taken. For such a branch prediction mechanism the observed instruction behaviour in the local history record could indicate at least one of: the observed branch outcome (taken or not taken), and a branch target address of the branch. Some forms of local history record may only track the branch outcome, while others may only track the sequence of branch target addresses, and others may track both.

In another example, the prediction circuitry may comprise load value prediction circuitry to predict, as the predicted instruction behaviour, a predicted load data value predicted to be loaded from memory in response to a load instruction. Such load value prediction circuitry can be useful because it enables subsequent dependent instructions which need to perform an operation using the loaded data value to be executed before the loaded data value has actually been returned from the memory system. For the load value prediction circuitry, the observed instruction behaviour tracked in the local history record may be observed sequences of data values from two or more load instructions having addresses in the corresponding subset.

Another example may provide prediction circuitry which comprises address prediction circuitry to predict, as the predicted instruction behaviour, a predicted target address for a load instruction. Hence, rather than attempting to predict the actual data value to be loaded, the address of a load instruction can be predicted so that the load can be issued to memory before the operands needed for calculating the address have actually been determined by earlier instructions. For such address prediction circuitry, the observed instruction behaviour tracked in the local history records could be the actual target addresses observed for successive load instructions themselves, or could indicate observed strides between observed target addresses, where the stride represents the difference between the addresses of two successive loads.

Hence, it will be appreciated that the technique discussed above can be applied to a range of different forms of prediction mechanism. The examples described below show a branch prediction mechanism in particular, but it will be appreciated that the same shared pointer-based position tracking mechanism could be applied to other forms of prediction.

The technique discussed above could be applied either to an in-order processor or an out-of-order processor. However, the technique is particularly useful for out-of-order processing circuitry which supports execution of instructions in a different order to a program order. When out-of-order processing is supported, then this means that the observed instruction behaviour for a later instruction the program order may become available before the observed instruction behaviour for an earlier instruction in the program order, and so the corresponding updates of history in the local history records may also happen out of order, so a pointer tagging mechanism is used to track the restoration point for a given instruction. This is why maintaining local history records with separate pointers is particularly expensive for an out-of-order processor. By using a shared pointer shared between the local history records to track the common storage position reached in each of the local history records this reduces the overhead associated with the tagging of instructions with the pointers, to make implementation of prediction mechanisms based on local history tracking more feasible for an out-of-order processor enabling a better prediction accuracy for a given amount of circuit area and power cost.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; a register renaming stage 11 for mapping architectural registers specified by program instructions or micro-operations to physical register specifiers identifying physical registers in a register file 14; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 28 for performing load/store operations to access data in a memory system 8, 30, 32, 34.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The processor shown in FIG. 1 is an out-of-order processor where the pipeline 4 includes a number of features supporting out-of-order processing. This includes the issue stage 12 having an issue queue 35 for queuing instructions and issue control circuitry which is able to issue a given instruction for execution if its operands are ready, even if an earlier instruction in program order has not issued yet. Also the writeback stage 18 may include a reorder buffer (rob) 36 which tracks the execution and the commitment of different instructions in the program order, so that a given instruction can be committed once any earlier instructions in program order have themselves be committed. Also, the register renaming stage 11 helps to support out of order processing by remapping architectural register specifiers specifying the instructions decoded by the decode stage 10 to physical register specifiers identifying physical registers 14 provided in hardware. The instruction encoding may only have space for a register specifiers of a certain limited number of bits which may restrict the number of architectural registers supported to a relatively low number such as 16 or 32. This may cause register pressure, where after a certain number of instructions have been processed a later instruction which independent of an earlier instruction which references a particular register needs to reuse that register for storing different data values. In an in-order processor, that later instruction would need to wait until the earlier reference to the same register has completed before it can proceed, but these register dependencies caused by insufficient number of architectural registers can be avoided in an out-of-order processor by remapping the references to the same destination register in different instructions to different physical registers within the register file 14, which may comprise a greater number of physical registers than the number of architectural registers supported in the instruction encoding. This can allow a later instruction which writes to a particular architectural register to be executed while an earlier instruction which writes to the same architectural register is stalled, because those register references are mapped to different physical registers in the register file 14. It will be appreciated that other features may support out of order processing.

As shown in FIG. 1, the apparatus 2 has a number of prediction mechanisms for predicting instruction behaviour for instructions at particular instruction addresses. For example, these prediction mechanisms may include a branch predictor 40 and a load value or load address predictor 50. It is not essential for processors to have both forms of predictor. The load value or load address predictor is provided for predicting data values to be loaded in response to load instructions executed by the load/store unit 28 and/or predicting load addresses from which the data values are to be loaded before the operands for calculating the load addresses have been determined. For example the load value prediction may record previously seen values loaded from a particular address, and may predict that on subsequent instances of loading from that address the value is expected to be the same. Also, the load address predictor may track history information which records observed stride patterns of address accesses (where the addresses of successive loads differ by a constant offset) and then use that observed stride pattern to predict the address of a future load instructions by continuing to add offsets to the latest seen address at intervals of the detected stride.

Also, the branch predictor 40 may be provided for predicting outcomes of branch instructions, which are instructions which can cause a non-sequential change of program flow. Branches may be performed conditionally, so that they may not always be taken. The branch predictor is looked up based on addresses of instructions provided by the fetch stage 6, and provides a prediction of whether those instruction addresses are predicted to correspond to branch instructions. For any predicted branch instructions, the branch predictor provides a prediction of their branch properties such as a branch type, branch target address and branch direction (branch direction is also known as predicted branch outcome, and indicates whether the branch is predicted to be taken or not taken). The branch predictor 40 includes a branch target buffer (BTB) 43 for predicting properties of the branches other than branch direction, and a branch direction predictor (BDP) 42 for predicting the not taken/taken outcome of a branch (branch direction). It will be appreciated that the branch predictor could also include other prediction structures, such as a call-return stack for predicting return addresses for function calls, a loop direction predictor for predicting when a loop controlling instruction will terminate a loop, or other specialised types of branch prediction structures for predicting behaviour of branches in specific scenarios. The BTB 43 may have any known BTB design and will not be described in detail here. In general the BTB may act as a cache correlating particular instruction addresses with sets of one or more branch properties such as branch type or the branch target address (the address predicted to be executed next after the branch if the branch is taken), and may also provide a prediction of whether a given instruction address is expected to correspond to a branch at all.

The branch direction predictor 42 may be based on a variety of different prediction techniques, e.g. a TAGE predictor or a perceptron predictor, which includes prediction tables which track prediction state used to determine whether, if a given instruction address is expected to correspond to a block of instructions including a branch, whether that branch is predicted to be taken or not taken. The BDP 42 may base its prediction on local history records tracked in local history storage circuitry 44. The local history records will be discussed in more detail below, but in general they provide tracking of sequences of observed instruction behaviour for instructions whose instruction addresses map onto a particular subset of instruction addresses, with a number of separate local history records being provided for different subsets of instruction addresses. This can be used for indexing into the prediction tables of the BDP 42 or in some cases to provide a direct prediction of the predicted branch behaviour.

The apparatus 2 may have branch prediction state updating circuitry and misprediction recovery circuitry 46, which updates state information within the branch predictor 40 based on observed instruction behaviour seen at the execute stage 16 for branch instructions executed by the branch unit 24. When the branch instruction is executed and the observed behaviour for the branch matches the prediction made by the branch predictor 40 (both in terms of whether the branch is taken or not and in terms of other properties such as branch target address) then the branch prediction state updating circuitry 46 may update prediction state within the BDP 42 or the BTB 43 to reinforce the prediction that was made so as to make it more confident in that prediction when that address is seen again later. Alternatively if there was no previous prediction state information available for a given branch then when that branch is executed at the execute stage 16, its actual outcome is used to update the prediction state information. Similarly, the local history storage 44 may be updated based on an observed branch outcome for a given branch. On the other hand, if a misprediction is identified when the actual branch outcome 24 differs from the predicted branch outcome in some respect, then the misprediction recovery portion of the state updating/misprediction recovery circuitry 46 may control updating of state within the branch predictor 40 to correct the prediction state so that it is more likely that the prediction will be correct in future. In some cases, a confidence counter based mechanism may be used so that one incorrect prediction does not necessarily overwrite the prediction state which has previously been used to generate a series of correct predictions, but multiple mispredictions for a given instruction address will eventually cause the prediction state to be updated so that the outcome actually being seen at the execute stage 60 is predicted in future. As well as updating the state information within the branch predictor 40, on a misprediction, the misprediction recovery circuitry may also cause instructions to be flushed from the pipeline 4 which are associated with instruction addresses beyond the address for which the misprediction was identified, and cause the fetch stage 6 to start refetching instructions from the point of the misprediction.

Selecting entries of the BDP 42 based on instruction address alone may not give accurate predictions in all cases, because it is possible that the same instruction address could be reached by different paths of program flow depending on outcomes of previous instructions, and depending on the path taken to reach the current instruction, this may lead to different actual instruction behaviour for the same instruction address. Therefore, modern branch predictors may also select the predictions based on history information which tracks a sequence of previously seen instruction behaviour. In most modern branch predictors, global history is used as the branch history format. FIG. 2 shows an example of tracking of global history where a sequence of taken and not taken outcomes for a series of branches is tracked with a shift register. A single shift register is used to track the previous branch outcomes for all instructions regardless of their instruction addresses. Each time a branch outcome is determined by the branch unit 24, the corresponding taken/not taken outcome is indicated by a bit shifted into the shift register at one end, and this causes the oldest branch outcome indication to be shifted out at the other end, so that the branch behaviours for the most recently seen N branch instructions (where N is some integer) are tracked. For example, N can be relatively large in modern CPUs, for example greater than 100.

While the shift register approach shown in FIG. 2 can be useful for in order processors, for out-of-order processors the fact that instructions may execute out of order and a misprediction may require the history to be restored to a previous state (so that outcomes shifted into the history register for instructions after the misprediction point are not considered for later predictions), then rather than implementing the global history as a shift register it is common to use a ring buffer as shown in FIG. 3. A pointer 53 is used to mark a current storage position within the ring buffer, and each time a new branch outcome is added to the buffer then the pointer is advanced to move to the next location. Once all the locations of the ring buffer are filled, then when the pointer advances from the last location in the ring buffer it returns to the first location and continues to cycle around the ring in response to successive updates. When a prediction needs to be made then the portion of the ring buffer selected to form the prediction may be the portion of entries ending just before or at the location marked by the pointer 53 (depends on the way the pointer is defined). For example when the pointer was at position marked A then the prediction may be based on a sequence of outcomes ending NNTT and when the pointer is at position B then the last four branch outcomes indicated would be NTTN.

When out-of-order execution is performed in a processor then the processor may need to unroll an arbitrary version of previously recorded history state when a misprediction occurs. To support that, at the fetch stage 6 or decode stage 10 the current version of the pointer 53 at the time an instruction is supplied for processing by the pipeline may be recorded as a tag passed along the pipeline with the instruction. Once the instruction reaches the execute stage, then if a misprediction occurs then the pointer may already have moved past the point at which it was pointing when that instruction was fetched/decoded, and in an out-of-order processor the ring buffer may already include outcomes indicated for incorrectly executed instructions beyond the mispredicted instruction in program order (which were executed before the mispredicted instruction due to the order of processing). By restoring the pointer 53 based on the tagged pointer associated with the instruction that was mispredicted, then the pointer can be reversed and any subsequent entries beyond that pointer in the ring buffer can be overwritten as new branch behaviour is identified, to prevent that potentially incorrect behaviour being used to form predictions.

The global history approach shown in FIGS. 2 and 3 can work well, however it is possible that the sequence of branch outcomes for an instruction at one address may be the same as the sequence of branch outcomes observed prior to an instruction at another address even though those two instructions have very different actual branch behaviour. Hence, to improve prediction accuracy, it is possible to use a local history approach as shown in FIG. 4, where multiple shift registers are provided to record separate local history records for different subsets of instruction addresses (program counters, PC). Hence, with this approach if an instruction satisfying a given history update condition (e.g. that the instruction is a branch, or that it is a branch of a particular type) is encountered, then the instruction address (PC) of that instruction may be hashed to identify a selected one of the local history records and then the selected local history record may be shifted up one position and the taken or not taken outcome of the executed branch may be shifted into the least significant bit of the history record that was selected. Again, in an out-of-order processor, rather than using a shift register, the equivalent information for each local history record could be represented as a ring buffer similar to the one shown in FIG. 3 with a pointer tracking the current location to where it would be updated. However, a problem with this approach is that as each local history record may be updated at different rates, a separate pointer 53 is needed for each local history record, and instructions passing down the pipeline would need to be tagged with N different pointers where N is the number of local history records provided, so that if an instruction is mispredicted then all of the local history records can be restored to the correct state reversing any changes made by early-executed instructions beyond the mispredicted instruction in program order. This means that the overall pointer cost will be N times larger than that of global history, which is a barrier to adopting local history in commercially implemented branch predictors.

Figure 6:
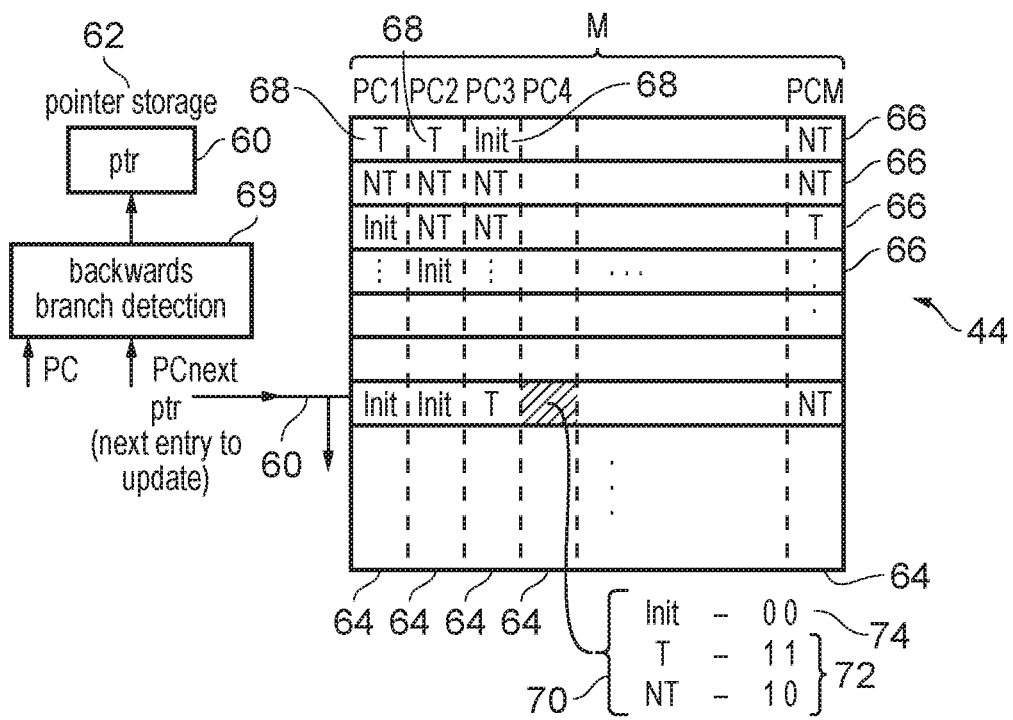
FIG. 6 shows a hardware implementation of the local history records shown in FIG. 5, where a number of local history records share a common pointer indicating a common storage position reached in each of the local history records.

FIGS. 5 and 6 illustrate a different approach used for the local history storage 44 in the example of FIG. 1, where rather than each local history record advancing in state independently, the advancement of all of the local history records 64 is controlled in common based on a shared pointer. A shared pointer advance event which causes each of those records to move on one position. Hence, the advancement of the pointer is not done at the time of updating an individual local history record 64, but rather is done when a certain pointer advance event is encountered. As shown in FIG. 5, the pointer advance event could be a backwards taken branch, so that when an event is detected which is identified as being a backwards change of program flow, then the pointer shared by all of the local history records 64 is advanced in position, effectively shifting up the history information by one position (although in practice if the ring buffer implementation is used in hardware then there is no actual shifting of the data itself, as this is simulated by moving a pointer along one position). At the time of encountering a branch which satisfies the branch history update condition, the local history record for the subset of instruction addresses including the address of the executed branch is updated to indicate the taken or not taken outcome of that branch (the updated entry of that local history record being selected based on the shared pointer), but at this time there is no advancement of the pointer, as the taken/not-taken outcome of the latest branch can simply be inserted into the bottom location of the shift register or into the next location of the ring buffer as the pointer would already have advanced earlier when a backwards taken branch was encountered.

FIG. 6 shows an example of the hardware implementation of the history storage 44, as opposed to the logical view seen in FIG. 5. Again, the history storage 44 can be implemented as a ring buffer with a pointer 60 stored in pointer storage circuitry 62 indicating the current position reached in the ring buffer. However, with this approach the pointer 60 is a shared pointer which is shared between each of the M local history records 64 maintained in the history storage circuitry 44 (M is an integer chosen by the hardware designer). For example, the ring buffer could be divided into entries 66, with each entry including an item of history state information 68 for each of the M local history records. Hence, the history record 64 for a given subset of program counters can be considered to be a stripe of state entries 68 at corresponding positions within each of the ring buffer entries 66. The subsets of program counters are denoted by labels PC1, PC2, PC3, PC4, etc., each referring to a group of instruction addresses which may be discontiguous in the address space.

As shown in FIG. 6, each history state item 68 has one of several alternative state indicating values 70. These include a number of instruction behaviour state indicating values 72 which indicate the different types of instruction behaviour which could be observed for a given instruction, for example in this case a taken state indicating value (e.g. encoded as 0b11) indicating that the corresponding branch was taken and a not taken state indicating value (e.g. encoded as 0b10) indicating that the corresponding branch was not taken. It will be appreciated that for other types of predictor, the observed instruction state indicating values could indicate different types of instruction behaviour and could include more than two states. Also, a given history state item 68 can be set to an initialisation state 74 (e.g. encoded as 0b00) to which a given history state item 68 is set when the pointer is advanced to the location including that state item. The initialisation state 74 indicates that no update of that history state item 68 has occurred since the pointer was advanced to point to that history state item, and this can distinguish cases when there have been no update of a given history record 64 between successive pointer advance events from cases where there has been an actual instance of updating that state item to one of the observed instruction behaviour states 72.

Hence, when a branch is executed which meets a history update condition (e.g. that it is a branch of a certain type or alternatively that it simply is an executed branch regardless of type), the branch predictor 40 (and/or branch prediction update circuitry 46) selects the history record 64 which corresponds to the subset of addresses including the instruction address of that branch (e.g. by applying a hash to the branch instruction address to identify the identifier of the selected history record). The history item at the position within the selected history record 64 identified by the shared pointer 60 is updated to specify either taken or not taken depending on the outcome of the executed branch. This replaces the initialisation value 74 previously set to that entry at the most recent pointer advance event. The same pointer 60 is used to select which ring buffer entry 66 (i.e. which history item 68 to update within the selected history record 64) should be updated regardless of which of the history records 64 is selected for the current branch.

Backwards program flow (branch) detection circuitry 69 is provided to detect instances of backwards changes of program flow, where after executing a first instruction having a first instruction address, a second instruction having a second instruction address with a lower value than the first instruction address is encountered. Note that such backwards changes of program flow may be caused by branch instructions having a dedicated branch instruction encoding, but could also be caused by other types of instructions not having the branch instruction encoding. For example, a program counter register which stores the program counter representing the current point of execution could be specified as a destination register by using instructions which specify a particular architectural register specifier, and so any instruction which has the destination register identified by that particular register specifier may update the program counter and effectively cause a branch even if they are not a dedicated branch instruction. Hence, regardless of whether a backwards branch is caused by a branch instruction or not, the backwards branch detection circuitry 69 may receive the address (PC) of one instruction and the address ($PC_{next}$) of the next instruction and may compare them to detect a case when the next instruction has a lower instruction address than the previous instruction. When a backwards branch is detected then the shared pointer 60 and in the pointer storage 62 may be updated to move to the next location of the ring buffer 44 and then the items of history states for the respective history records 64 in the next entry of the ring buffer 44 may all be set to the initialisation state 74 ready to accept subsequent updates based on executed branches.

Figure 7:
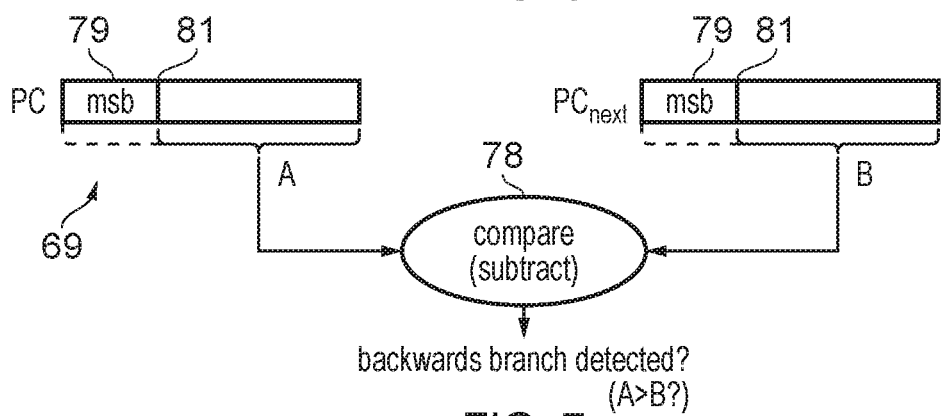
FIG. 7 shows an example of backwards program flow change detection circuitry.

FIG. 7 shows the backwards branch detection circuitry 69 in more detail. The backwards branch detection circuitry includes a comparator 78 which compares the instruction addresses of two successive instructions. As shown in FIG. 7, while in some embodiments the comparator 78 could be provided with the entire addresses of PC and $PC_{next}$, in practice comparison of a most significant portion 79 of the meaningful bits of the respective addresses (excluding any bits which are the same for all instruction addresses, which are ignored in the representation shown in FIG. 7) may not often have any impact on whether or not the change of program flow from the current instruction to the next instruction is a forwards or backwards change of program flow. Therefore, to reduce the hardware cost of the comparator 78, in some cases the portions A, B, of the addresses PC, $PC_{next}$ that are compared by the comparator 78 may exclude these most significant portions 79 and may only be based on lower portions. This may be counterintuitive since one would expect that by ignoring meaningful bits within the most significant portion 79, it is possible that the comparator 78 may generate a false positive or false negative detection of whether a backwards branch has been detected. However, in practice such false positives and false negatives may be rare as they only occur when the transition from PC to $PC_{next}$ crosses the boundary 81 between the portions A, B compared by the comparator and the more significant portion 79 excluded from the comparison, and this may not happen often. The performance penalty of occasionally getting mispredictions because the comparator fails to detect a backwards branch and so the same entry of a given local history record 64 is updated twice based on different instructions in the same history item 68 (losing history information due to overwriting) may be less than significant than the hardware costs that would be incurred if the more significant portion 79 of the addresses were compared for every instruction. By excluding portion 79 from the comparison the power and circuit area cost of the comparator 78 can greatly be reduced without significantly affecting history accuracy. Nevertheless, as shown by the dotted line other implementations may perform the comparison using the full addresses including the most significant portion (but again excluding any unmeaningful bits which take the same value for all instruction addresses).

Hence, with the approach shown in FIG. 6, a shared pointer can be shared between multiple local history records 64 to avoid needing to provide multiple pointers tagged with each instruction passing down the pipeline. This enables rollback back to previous points in the history records when a misprediction occurs, and this greatly reduces the cost of implementation. As a backwards branch is used to trigger advancement of the pointer, it is unlikely that the same entry will be updated twice between pointer advance events, reducing risk of loss of history information.

Figure 8:
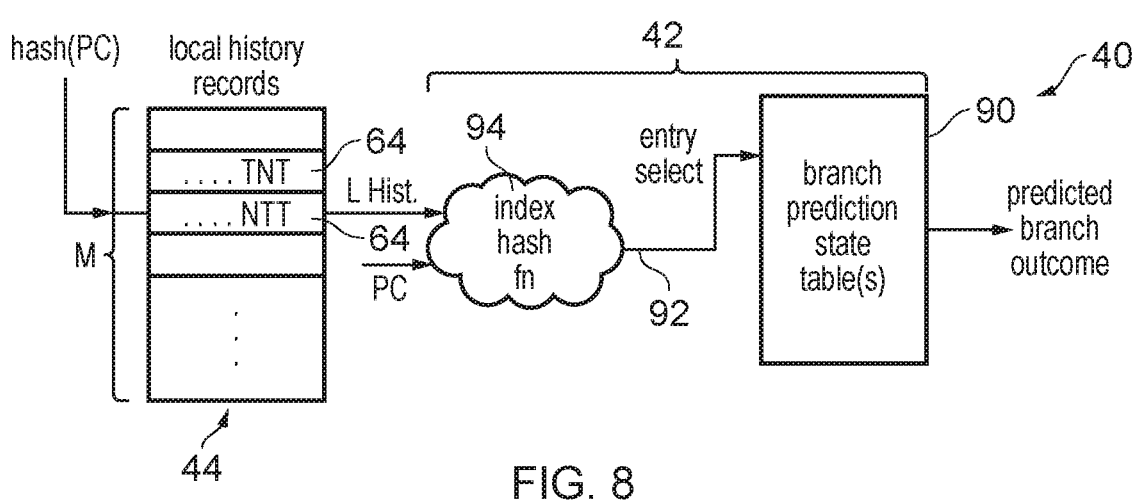
FIG. 8 shows an example where the local history records are used to index into one or more prediction tables.

FIG. 8 shows a first example of how the local history records can be used to control the predictions made by the branch predictor 40. In this example the BDP 42 includes one or more branch prediction state tables 90, which are indexed by an index value 92 used to select which entries of the prediction state tables to access. The prediction state tables could for example be TAGE tables of a TAGE branch predictor, where each TAGE table is indexed with a different length of a portion of history information from the selected local history record 64 which is selected based on the hash of the program counter as shown in the left-hand part of FIG. 8. Alternatively, the state in the prediction state tables could be weights which are added together in a perceptron-based type of branch direction prediction. The particular approach used to form the prediction using the tables 90 is not important, and any known branch direction prediction state tables could be used. In general, FIG. 8 shows that the local history record 64 can be used to form an index into the prediction state tables, rather than directly forming the predicted branch outcome itself. While FIG. 8 shows the local history records logically using a similar representation to FIG. 5, it will be appreciated that in practice the history storage 44 may be implemented as in the ring buffer example of FIG. 6 so that the local history record 64 may effectively extend vertically across the entry to the buffer as in FIG. 6.

Figure 9:
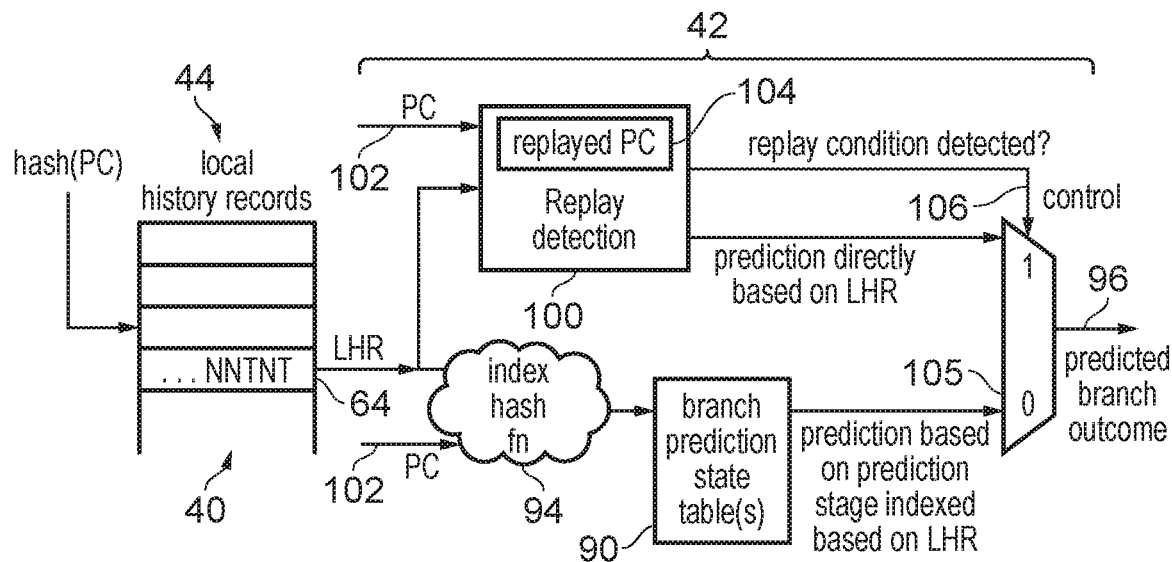
FIG. 9 shows an example where the prediction circuitry is also able to directly form a prediction based on information from a selected local history record, when a replay condition is detected.

FIG. 9 shows an alternative example of a branch predictor 40 where (as well as supporting indexing into branch prediction state tables 90 based on a selected local history record 64) the branch predictor also supports a replay function which allows a branch direction outcome recorded in the selected local history record 64 to be used to directly indicate a predicted branch outcome 96 to be output for a given instruction address. This recognises that often in program execution following a branch instruction there may be a selection of one of two alternative paths of program flow, but then eventually those paths may then reconverge so that after the reconvergence point a further branch instruction may be executed which may execute correctly regardless of the outcome of the earlier branch. For such further branch instructions which are independent of any instructions within either of the alternative program flow paths following the branch, the outcome of such instructions will be correct even if the earlier branch is mispredicted.

In most typical branch predictors, if a misprediction is identified then any subsequent instructions beyond the misprediction point are flushed from the pipeline and then re-executed. The prediction state would be rewound to the point of the misprediction and so any subsequent branches which were in the part of the program flow beyond the reconvergence point may then be re-executed and subject to branch prediction which could potentially be incorrect. However, in the case where there is reconvergence of program flow beyond a mispredicted branch, the inventors have found that in practice such a re-executed branch within the reconverged part of the program flow may actually have the same outcome as it did the first time that instruction was executed following the mispredicted branch, and its actual outcome from that first attempt to execute it may have been allocated into the local history storage 44, and so this indication can be used to directly form the predicted branch outcome when that instruction is later re-executed once program flow resumes following restoration due to the misprediction. This prediction based on the direct indication in the local history record rather than based on the branch prediction state tables 19 may often be more accurate for that re-executed instruction within the reconverged portion of the program flow.

Hence, the branch prediction circuitry 40 may include replay detection circuitry 100 to detect, for a given program counter address 102 for which a prediction is to be made whether that program counter address corresponds to an address recorded in a replay state storage structure 104 indicating one or more addresses of replayed instructions which are expected to be executed again following an earlier misprediction and which are expected to be likely to have the same outcome as previously. For example, when performing speculative execution following a predicted branch instruction, the replay detection circuitry 100 may identify subsequent branches whose outcome is likely to be independent of the previously predicted branch and may allocate the program counter addresses of such instructions into the replay state storage structure 104. If a misprediction occurs for an earlier branch and there is a flush of the pipeline, then the subsequent branch which was independent of the mispredicted branch may end up being executed again and if the program counter address 102 for such an instruction matches one of the addresses stored in the replay state storage structure 104 then a replay condition may be detected. When the replay condition is detected then the entry indicated by the shared pointer within the local history record 64 corresponding to the current program counter value 102 may be output as a direct prediction of the predicted branch outcome. A multiplexer 105 may select between the prediction output based on the branch prediction state tables 90 and the direct prediction based on the local history, depending on a control signal 106 indicating whether the replay condition was detected. With this approach, a more accurate prediction can be made for a replayed instruction which is independent of an earlier mispredicted branch. More information of this replay mechanism can be found in the co-pending U.S. patent application Ser. No. 16/752,995 filed on 27 Jan. 2020 by Arm® Limited of Cambridge, UK, the contents of which are entirely incorporated herein by reference.

Hence, FIG. 9 shows that it is not essential to use the local history information as an index into other prediction state tables, but in some scenarios it is also possible to base predictions based on the sequence of instruction behaviour recorded in the local history record directly.

FIGS. 10-13 show a set of flow diagrams showing the functionality at different portions of the processing apparatus 2 when interacting with the local history information in the local history storage 44.

Figure 10:
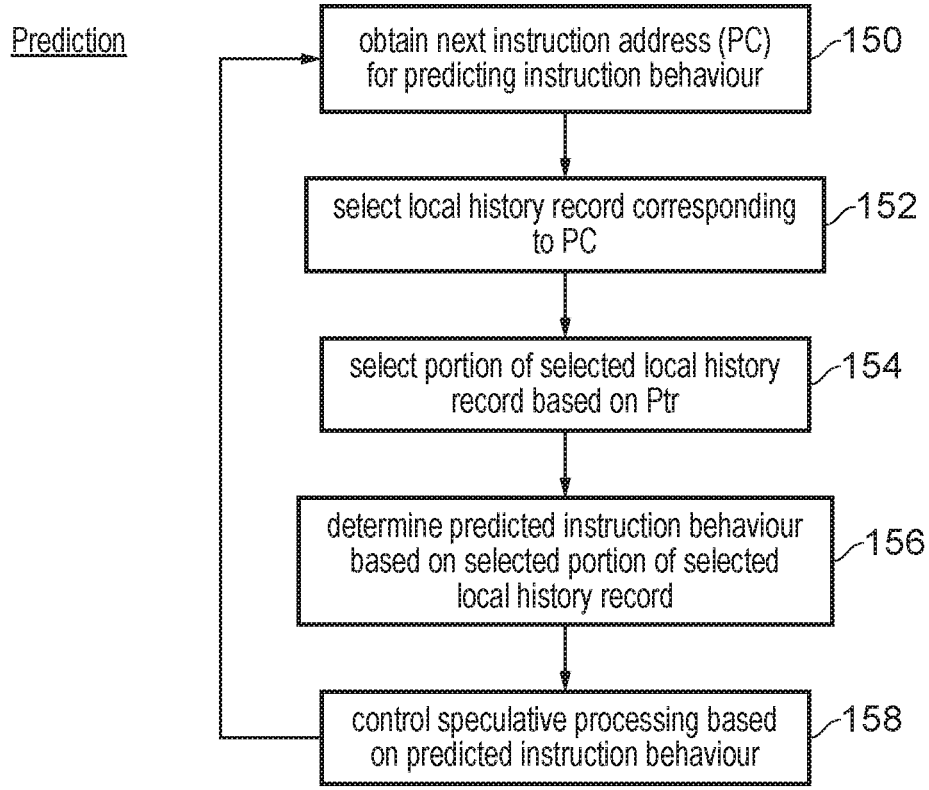
FIG. 10 is a flow diagram showing a method of determining a prediction based on a selected local history record.

FIG. 10 shows operations performed by the branch predictor (prediction circuitry) 40 for generating the predicted instruction behaviour 4 for a given instruction address (PC). At step 150 the branch predictor 40 obtains the next instruction address for which a prediction is to be made. Note that the next instruction address may in some examples represent the address of a certain block of two or more instructions for which predictions are to be made, in implementations where the branch predictor uses a BDP 42 or BTB 43 for which entries represent predictions for a block of instructions at a time. This can be more efficient than doing a separate lookup for each individual instruction address.

At step 152 the branch predictor 40 selects one of the local history records 64 from the local history buffer 44 depending on the PC representing the next instruction address. For example a hash of the PC may be generated, and this hash may be used to select which local history record 64 is the selected local history record. The hash of the PC effectively divides the overall address base into a number of subsets of instruction addresses with each subset of instruction addresses corresponding to a different local history record 64. The hash may be chosen so that adjacent addresses are in different subsets, for example.

At step 154, the branch predictor 40 selects a particular portion of the selected local history record based on the shared pointer 60. The same shared pointer 60 is used for this selection regardless of which local history record 64 was selected at step 152. In some implementations of branch predictors, the size of the selected portion may be the same for all lookups. Other approaches may have a number of different prediction state tables which require different sizes of the portion of selected local history, so a number of selections of different portions of different sizes may be made, with each of those portions ending with the location pointed to by the pointer 60 (or in some implementations ending with the location immediately preceding the location pointed to by the pointer 60).

At step 156 the branch predictor 40 determines a predicted instruction behaviour based on the selected portion of the selected local history record. In some cases prediction state entries from prediction state tables looked up based on different portions of the selected history record may be combined to form the predicted instruction behaviour (e.g. weights added together in a perceptron predictor, or a cascaded selection between TAGE table outputs to find the longest table providing a hit for a TAGE predictor). Also the predicted instruction behaviour could be derived directly from the selected portion of the selected local history record, if a replay condition is satisfied. At step 158 the branch predictor 40 controls speculative processing of subsequent instructions based on the predicted instruction behaviour. For example the fetch stage 6 may control which subsequent instructions are fetched after the current PC based on whether a branch was predicted to be taken or not taken. The method then returns to step 150 to carry on making a prediction for the next instruction address.

Figure 11:
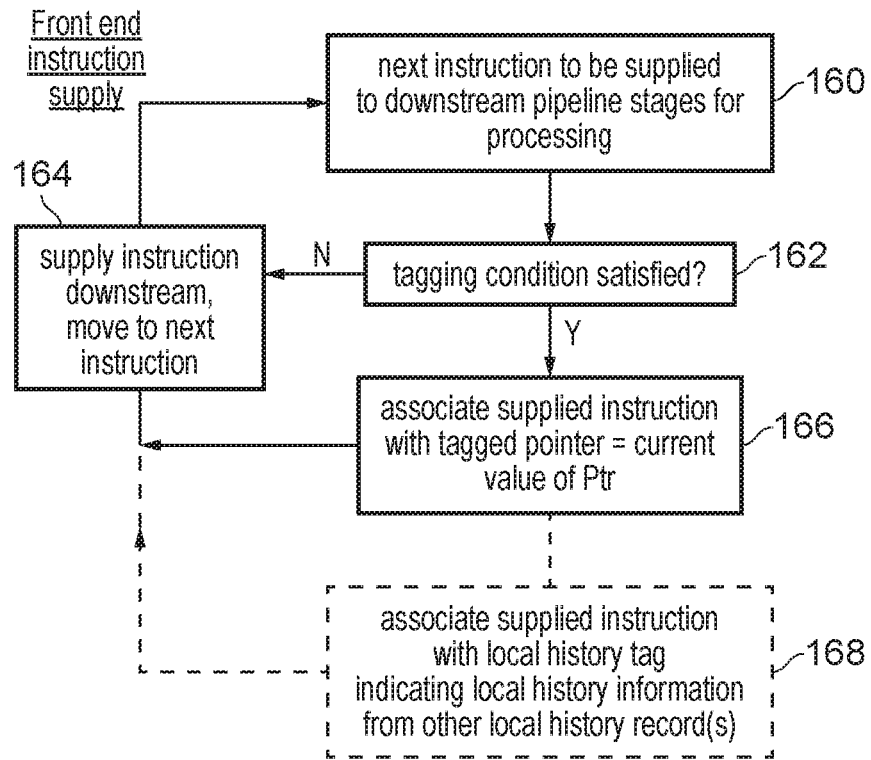
FIG. 11 is a flow diagram illustrating a method of controlling supply of instructions at a front end stage of the pipeline, including tagging of instructions with a tagged pointer.

FIG. 11 shows functions performed by front end circuitry, which may be one of the front end stages of the pipeline, e.g. the fetch stage 6 or the decode stage 10. The front end circuitry 6, 10 associates instructions supplied to downstream pipeline stages with a tagged pointer corresponding to the current value of the shared pointer 60 for the local history storage 44. At step 160 the front end circuitry 6, 10 determines the next instruction to be supplied to downstream pipeline stages for processing. At step 162 the front end circuitry determines whether a tagging condition is satisfied. For some implementations all instructions may be considered to satisfy the tagging condition. In this case the tagging condition will always be satisfied. However, for some implementations a further condition may be imposed, such as whether the instruction was identified by the decode stage 10 to be a branch instruction. If the tagging condition is not satisfied then there is no need to associate the instruction with a tagged pointer and the overhead of looking up the shared pointer value 60 can be avoided. In this case, at step 164 the instruction is simply supplied downstream and the front end circuitry moves on to process the next instruction and returns to step 160.

However if the tagging condition is satisfied then at step 166 the front end circuitry 6, 10 associates the supplied instruction with a tagged pointer value selected based on the current value of the shared pointer 60. This association could be enforced in different ways. In one example the instructions passing down the respective pipeline stages of the pipeline 4 have an associative tagged pointer value so that by the time they reach the execute stage 16 the tagged pointer value can be provided to the misprediction recovery circuitry 46 to control restoration of local history if necessary. In this case, the signal paths for conveying instructions down the pipeline may be wider than in implementations which do not tag instructions with a tagged pointer, to include the additional signal path channels for providing the bits of the tagged pointer value. Alternatively, the front end instruction supply circuitry 6, 10 or the branch predictor 40 could include a storage structure which maps instruction identifiers of supplied instructions to corresponding values of tagged pointers. In this case, it is not necessary for the instructions themselves to carry associated tagged pointer values down the pipeline, as instead the identifier of a mispredicted instruction could be used to lookup the tagged pointer storage structure to identify the corresponding tagged pointer value. Either way, having appended the tagged pointer to the instruction or recorded it in a separate storage structure, the method proceeds from step 166-164 to supply the instruction downstream and move to considering the next instruction.

FIG. 11 shows an optional step 168 which could be performed in some implementations but is not essential. If step 168 is performed, then in addition to associating the supplied instruction with the tagged pointer, a local history tag value is also associated with the supplied instruction. Again this can be performed by passing the local history tag down the pipeline to accompany the supplied instruction or by recording it in a separate storage structure. The local history tag indicates local history information form one or more other local history records, other than the local history record 64 which corresponds to the subset of instructions including the PC of the supplied instruction. For example, a simple way of generating the local history tag can be simply to capture all the state indicating entries 68 within the entry 66 of the ring buffer 44 which is pointed to by the shared pointer 60 at the time of tagging the supplied instruction. This will include the item of history state corresponding to the supplied instruction itself (within the local history record 64 for the corresponding subset of instructions including the PC of the supplied instruction), but will also include the corresponding items of instruction behaviour 68 from each of the other local history records which do not correspond to the PC of the current instruction. One might question why it is useful to record local history for subsets of addresses not related to the address of the supplied instruction. However as described further with respect to FIG. 13 below this can be used to more precisely restore contents of local history record on a misprediction. This additional tagging of local history with supplied instructions may help to improve performance slightly by avoiding as many mispredictions following recovery of history information following an earlier misprediction, but is not essential and some microarchitecture designers may prefer to reduce the overall hardware implementation cost by avoiding the local history tagging, so as to reduce the size of the storage structure used to associate the supplied instructions with tag information or the width of the channels for passing instructions down the pipeline.

Figure 12:
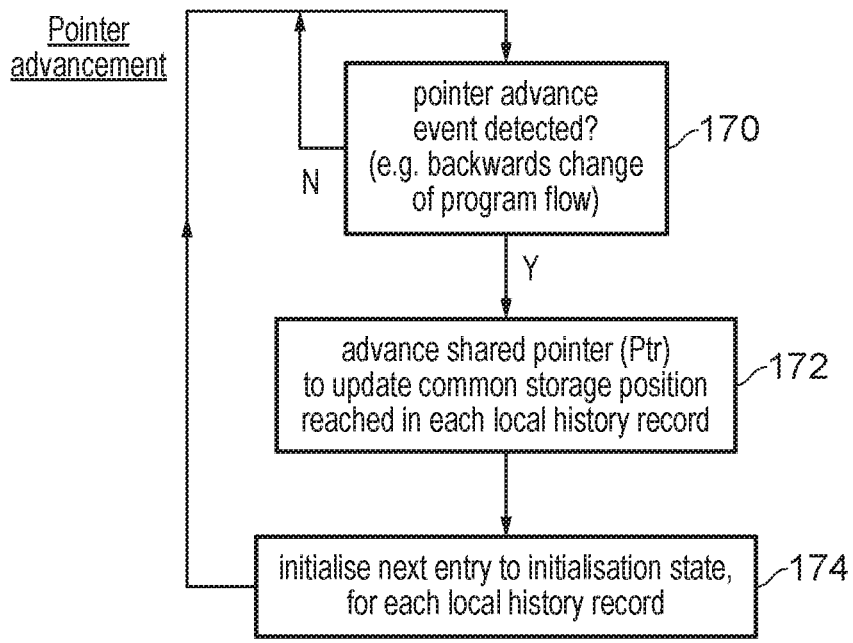
FIG. 12 is a flow diagram showing a method of controlling advancement of the shared pointer for the local history records.

FIG. 12 is a flow diagram showing control of pointer advancement based on the backwards branch (change of program flow) detection circuitry 69. At step 170 the backwards branch detection circuitry 69 detects whether a pointer advance event has been detected. For example, this may be the detection of a potential backwards change of program flow as detected by the comparison circuitry 78 shown in FIG. 7. As discussed above, to limit the hardware cost of this comparison a less precise comparator may be provided which does not compare the full addresses but rather compares only limited portions of the addresses excluding more significant portion 79. Hence, it is possible that the detection of a pointer advance event at step 170 is a false positive detection (and some actual backwards branches may be missed due to a false negative).

If no pointer advance event has been detected then the method returns to step 170 to keep monitoring for pointer advance events. The lack of detection of pointer advance events could in some cases be a false negative detection when a pointer advance event should have been detected but was not detected due to imprecision in the detection logic. Nevertheless, this is not a problem in that it may result in a limited number of mispredictions but may not change the correctness of the processing being performed eventually (as the mispredictions may subsequently be detected and recovered from), and in practice the power and circuit area saving of making the detection logic less precise may be more advantageous than the minute increase in prediction accuracy that could be provided by a more precise detection.

When a pointer advance event is detected, then at step 172 the shared pointer 60 is advanced so that the common storage position indicated for each of the local history records is updated to point to the next entry 66 of the history storage circuit 44. The shared pointer advances for each of the local history records 64 regardless of whether any update to that record was made since the previous time the pointer advanced, so it is possible that, as shown in FIG. 6, some entries 66 which have been bypassed by the pointer 60 may still store the initialisation values 64 rather than storing an actual observed instruction behaviour (T/NT).

Also, in response to the pointer advanced event being detected, at step 174 the backwards branch detection circuitry 68 controls the next entry 66 of the buffer now being pointed to by the pointer 60 to be set to the initialisation state 74 in all of the local history records 64, so as to clear any previously set instruction behaviour recorded in this new entry and to avoid any taken or not taken indications being recorded in that entry until an actual observed instruction behaviour is seen for a relevant branch corresponding to the subset of instruction addresses for a given history record 64. The method then returns to step 170 to continue monitoring for pointer advance event. While the approach described above uses a backward change of program flow to signal a pointer advance event, because this will tend to make it more likely that the pointer will advance between any two instances of executing the same instruction, it would also be possible to increment the shared pointing response to other types of pointer advance events such as on a change of operating state, in response to a context switch between different execution contexts, etc.

Also, while the example of FIG. 6 shows an implementation where the shared pointer 60 points to the next entry to be updated, an alternative would be that the shared pointer points to the last entry that was filled with observed obstruction behaviour prior to a pointer advance event being detected, so that the entry to be updated when a new instruction behaviour is observed is actually the entry which is one place beyond the current location indicated by the pointer 60. In other words, the pointer could point to the last entry in the portion of the selected local history record 64 which is to be used to form a prediction, rather than pointing to the next entry to be updated. Hence it will be appreciated that there are a number of different ways of implementing the pointer relative to the positions to be updated and to be read on making predictions, and so the precise manner in which the selected portion of the selected history record 64 used to form predictions is selected may vary between different implementations. Similarly, which particular entry is restored on a misprediction or updated with newly observed obstruction behaviour may vary relative to the actual pointer value depending on which particular implementation is chosen.

Figure 13:
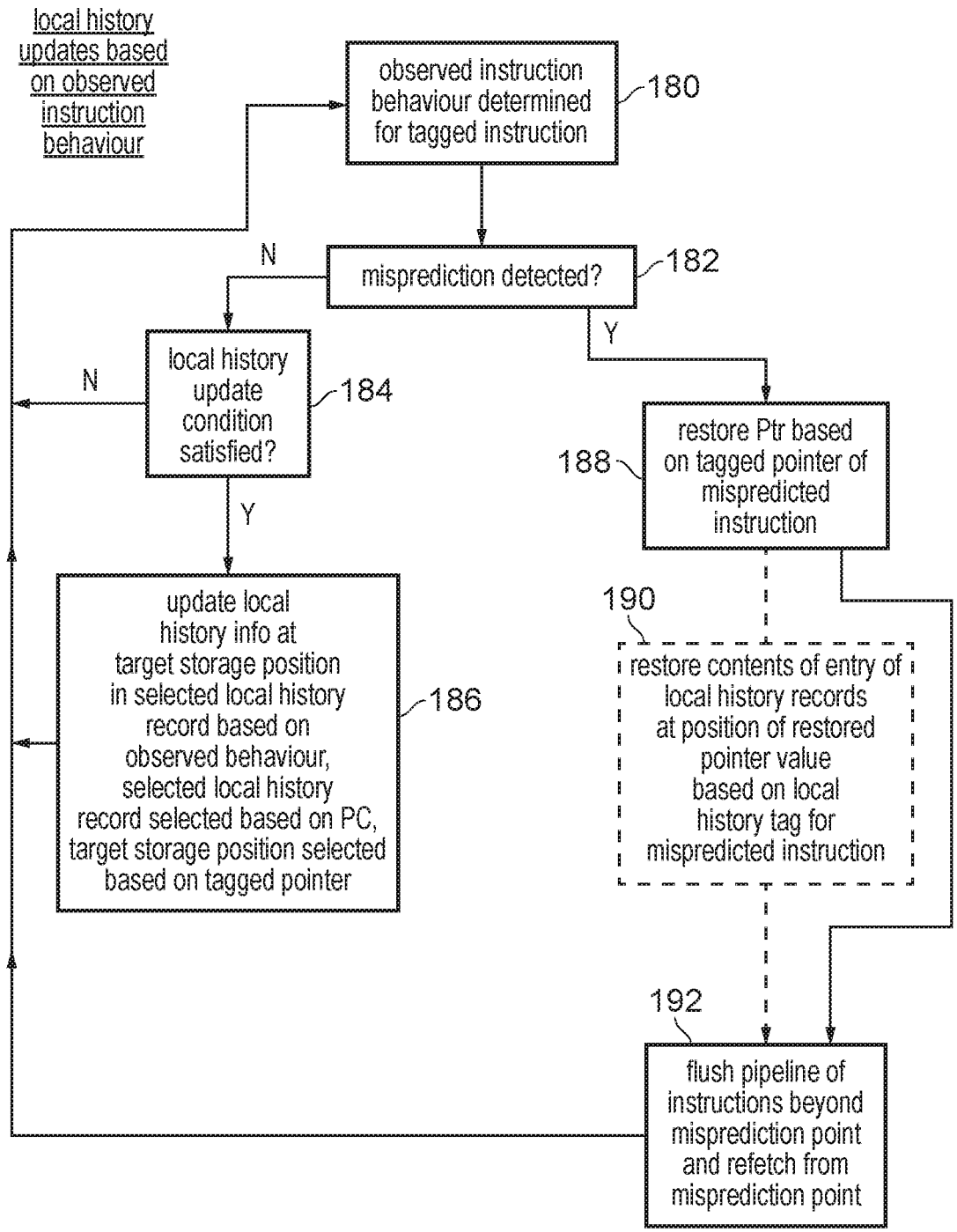
FIG. 13 is a flow diagram showing a method of controlling updating of the pointer and the local history records based on observed instruction behaviour resulting from execution of a tagged instruction.

FIG. 13 is a flow diagram showing updates made to the pointer and/or local history information based on observed instruction behaviour resulting from execution of branches at the branch unit 24 of the executed stage 16.

At step 180 the executed stage 16 determines an observed instruction behaviour for a particular tagged instruction which is associated with a tagged pointer value. At step 182 of FIG. 13, the branch prediction state updating/misprediction recovery circuitry 46 determines whether a misprediction has been detected for the tagged instruction, based on a comparison of the prediction made by the branch predictor and the actual instruction behaviour (branch outcome) evaluated by the branch unit 24. If the prediction was correct and no misprediction has arisen then at step 184 it has determined whether a local history updating condition is satisfied and if not then the method returns to step 180. It is not essential to update local history in response to every type of branch. In some cases only certain types of branches may be used to update local history. Alternatively, in some implementations there may be multiple sets of local history records corresponding to different types of branch instructions so that an appropriate set of local history records for the current type of branch may be selected. If the local history update condition is satisfied at step 184 then at step 186 a selected local history record 64 is selected based on at least the instruction address (PC) of the tagged instruction for which the instruction behaviour was observed (and also optionally based on other parameters such as the type of branch or other information). Also a target storage position is selected based on the tagged pointer of the executed instruction. The branch predictor 40 is then controlled by the branch prediction state updating circuitry 46 to update the local history information at the target storage position within the selected local history record, to indicate a state indicating value 72 corresponding to the observed instruction behaviour seen for the tagged instruction. Hence, if the tagged instruction was a taken branch then the item of history state 68 within the selected local history record 64 at a position determined based on the tagged pointer value associated with the tagged instruction is updated to indicate the taken state T and similarly if the branch was not taken then it would be updated to indicated the not taken state NT. Again, the selection of the target storage position may depend on the way in which the shared pointer 60 is managed relative to the location to be updated in the buffer 44. The target storage position could for example be the storage position directly identified by the tagged pointer, or could be the storage position at the next storage position after the position identified by the tagged pointer, depending on which of the implementations described above is chosen (if the shared pointer 60 points to the next location to be updated then the target storage position may be the one identified by the tagged pointer itself, while if the shared pointer 60 points to the location in the buffer 44 prior to the next one to be updated then at step 186 the FIG. 13 at the target storage position may be the next storage position after the one indicated by the tagged pointer).

FIG. 13 only shows the update to the local history information 44, but it will be appreciated that on correctly predicted branches there may also be changes to the branch prediction state within the BDP 42 or the BTB 43 to reinforce the correct prediction, making it more likely it will be predicted again for a subsequent attempt to execute a branch with the same instruction address and preceding pattern of branch history. The updating of the BDP 42 and BTB 43 can be done according to any known technique.

If at step 182 a misprediction was identified for the tagged instruction, then at step 188 the misprediction recovery circuitry 46 controls the branch predictor 40 to restore the pointer storage 62 so that the shared pointer 60 is updated based on the tagged pointer associated with the mispredicted instruction. The value to be restored to the pointer storage 62 can match the tagged pointer itself or could be a value offset from the buffer the tagged pointer, depending on how the pointer is managed.

At step 190, if the optional support for tagging of local history information is implemented as described at step 168 of FIG. 11, then the misprediction recovery circuitry 46 controls branch predictor 40 to restore the contents of entries of the respective local history records 64 position based on the local history tag associated with the mispredicting instruction. For example if the contents of all of the items of prediction states 68 within a given entry 66 of the ring buffer were captured at step 168 then these can simply be restored to the next entry to be updated as identified based on the restored value of the pointers set at step 188, so as to recover the observed instruction behaviour associated with the instructions which were executed between the most recent pointer advance event prior to the mispredicted instruction and the execution of the mispredicted instruction itself. This can allow greater prediction accuracy for subsequent instructions executed after resolving the misprediction, compared to the case when this restoration of local history information is not supported. If not supported, then step 190 can simply be omitted.

Regardless of whether the tagging of local history information is supported or not, at step 192 the misprediction recovery circuitry controls the processing pipeline 4 to flush any instructions which have instruction addresses beyond the misprediction point and controls the fetch stage 6 to resume fetching of instructions from the misprediction point of the program flow. Again, while not shown in FIG. 13, as well as updating the shared pointer 60 and optionally updating any local history information in response to misprediction, the branch predictor 40 may also update state within the BDP 42 or BTB 43 based on misprediction, according to any known technique.

The method then returns to step 180 to continue monitoring for observed instruction behaviour and to move to the next cycle of history updates when such relevant instruction behaviour is observed.

The detailed examples above describe the technique for tracking local history records using a shared pointer in the context of a branch predictor 40, where the instruction outcomes tracked in the local history records are taken/not-taken outcomes for branch instructions and the predicted instruction behaviour to be predicted based on this local history information is also a taken/not-taken outcome. An alternative would be that instead of tracking taken/not-taken outcomes in the local history record 64, the branch direction prediction could instead be based on local history records which track a series of observed branch target addresses for successive branches. In this case, on updating the history information at step 186 of FIG. 13, the state value written to a given item of history state 68 would indicate the particular branch target address seen for a branch rather than indicating the taken/not-taken prediction. Otherwise this implementation could function similar to the examples described above. Alternatively some approaches may combine these two implementations so that local history records 64 may track both taken/not-taken branch outcomes and branch target addresses (or hashes of branch target addresses).

However, the shared pointer approach for local history tracking can also be used for other forms of prediction mechanism such as the load value predictor or load address predictor 50. For a load value predictor, the information tracked in the local history records may correspond to data values observed to have been loaded in response to load instructions having addresses in the corresponding subset of instruction addresses for a given history record. The predicted instruction behaviour may be the values predicted to be loaded in response to subsequent instructions. Otherwise, the management of the pointer 60 which tracks the location in the local history record reached, which is shared between multiple local history records 64, can be performed in the same way as discussed above, with the pointer being advanced in response to backwards branches the same as for the branch predictor example. Similarly, if a load address predictor is provided which includes local history records which track observed sequences of address A then this could also used the shared pointer technique. Hence it is not essential for the prediction circuitry which uses the local history records to be a branch predictor 40.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:
1. An apparatus comprising:
 processing circuitry to perform data processing in response to instructions;
 history storage circuitry to store a plurality of local history records, each local history record corresponding to a respective subset of instruction addresses and tracking a sequence of observed instruction behaviour observed for successive instances of instructions having instruction addresses in that subset;

pointer storage circuitry to store a shared pointer shared between said plurality of local history records, the shared pointer indicative of a common storage position reached in each of the local history records; and prediction circuitry to determine predicted instruction behaviour for a given instruction address based on a selected portion of a selected local history record stored in the history storage circuitry;

where the prediction circuitry is configured to select the selected local history record based on the given instruction address and to select the selected portion based on the shared pointer.

2. The apparatus according to claim 1, in which the prediction circuitry is configured to select the selected portion dependent on the same shared pointer regardless of which of the local history records is selected as the selected local history record.

3. The apparatus according to claim 1, comprising front end circuitry to associate a supplied instruction supplied for processing by the processing circuitry with a tagged pointer determined based on the shared pointer stored in the pointer storage circuitry.

4. The apparatus according to claim 3, comprising misprediction recovery circuitry responsive to a misprediction detected for a given mispredicted instruction, to restore the shared pointer stored in the pointer storage circuitry to a value determined based on the tagged pointer associated with the given mispredicted instruction.

5. The apparatus according to claim 4, in which the front end circuitry is also configured to associate the supplied instruction with a local history tag indicative of at least one piece of local history information obtained from at least one local history record other than the local history record associated with a subset of instruction addresses including the instruction address of the supplied instruction; and in response to the misprediction, the misprediction recovery circuitry is configured to use the local history tag associated with the mispredicted instruction to restore said at least one piece of local history information to said at least one local history record.

6. The apparatus according to claim 3, in which in response to the processing circuitry determining observed instruction behaviour for an executed instruction satisfying at least one history updating condition, the prediction circuitry is configured to update the local history information at a target storage position in a target local history record based on said observed instruction behaviour for the executed instruction, where the prediction circuitry is configured to select the target local history record based on an instruction address of the executed instruction and to select the target storage position based on the tagged pointer associated with the executed instruction.

7. The apparatus according to claim 1, in which in response to a pointer advance event, the prediction circuitry is configured to advance the shared pointer stored in the pointer storage circuitry, to update the common storage position reached in each of said plurality of local history records.

8. The apparatus according to claim 7, in which in response to the pointer advance event, the prediction circuitry is configured to advance the shared pointer to advance the storage position reached in a given local history record even if no observed instruction behaviour was allocated to the given local history record since a previous pointer advance event.

9. The apparatus according to claim 7, in which the pointer advance event comprises an instance of detecting a backwards change of program flow indicative of a change of program flow from a first instruction to a second instruction having a lower instruction address than the first instruction.

10. The apparatus according to claim 9, comprising backwards program flow change detection circuitry to detect the backwards change of program flow based on comparison of the instruction addresses of the first instruction and the second instruction.

11. The apparatus according to claim 10, in which the backwards program flow change detection circuitry is configured to detect the backwards change of program flow based on a partial comparison of corresponding portions of the instruction addresses of the first instruction and the second instruction, said corresponding portions excluding most significant portions of the instruction addresses of the first instruction and the second instruction.

12. The apparatus according to claim 7, in which local history information at a given storage position in a given local history record has one of a plurality of states, said plurality of states including an initialisation state and at least two observed instruction behaviour states for indicating different observed instruction behaviour; and in response to the pointer advance event, the prediction circuitry is configured to set the local history information at a next storage position in each of said plurality of local history records to the initialisation state.

13. The apparatus according to claim 1, in which the prediction circuitry comprises at least one prediction table comprising a plurality of prediction state entries; and the prediction circuitry is configured to determine said predicted instruction behaviour based on said selected portion of the selected local history record by:
using said selected portion of the selected local history record to select at least one selected prediction state entry from said at least one prediction table; and
determining said predicted instruction behaviour based on said at least one selected prediction state entry from said at least one prediction table.

14. The apparatus according to claim 1, in which when a replay condition is satisfied for the given instruction address, the prediction circuitry is configured to determine said predicted instruction behaviour directly based on said selected portion of the selected local history record.

15. The apparatus according to claim 14, in which the replay condition is satisfied when the prediction circuitry detects that the given instruction address represents a block of one or more instructions including a replayed instruction to be re-executed following detection of a misprediction associated with an earlier instruction than the replayed instruction, when the local history record associated with the subset of instruction addresses including the given instruction address includes an indication of the observed instruction behaviour observed when the replayed instruction was executed previously prior to detection of the misprediction associated with the earlier instruction.

16. The apparatus according to claim 1, in which the prediction circuitry comprises branch prediction circuitry to predict, as the predicted instruction behaviour, a predicted branch outcome for a branch instruction.

17. The apparatus according to claim 1, in which the prediction circuitry comprises one of:

load value prediction circuitry to predict, as the predicted instruction behaviour, a predicted load data value predicted to be loaded in response to a load instruction; and address prediction circuitry to predict, as the predicted instruction behaviour, a predicted target address for a load instruction.

18. The apparatus according to claim 1, in which the processing circuitry comprises out-of-order processing circuitry configured to support execution of instructions in a different order to a program order.

19. An apparatus comprising:
means for performing data processing in response to instructions;
means for storing a plurality of local history records, each local history record corresponding to a respective subset of instruction addresses and tracking a sequence of observed instruction behaviour observed for successive instances of instructions having instruction addresses in that subset;
means for storing a shared pointer shared between said plurality of local history records, the shared pointer indicative of a common storage position reached in each of the local history records; and
means for determining predicted instruction behaviour for a given instruction address based on a selected portion of a selected local history record stored in the means for storing the plurality of local history records;
where the means for determining is configured to select the selected local history record based on the given instruction address and to select the selected portion based on the shared pointer.

20. A method comprising:
performing data processing in response to instructions;
tracking observed instruction behaviour in a plurality of local history records, each local history record corresponding to a respective subset of instruction addresses and tracking a sequence of observed instruction behaviour observed for successive instances of instructions having instruction addresses in that subset;
storing a shared pointer shared between said plurality of local history records, the shared pointer indicative of a common storage position reached in each of the local history records; and
determining predicted instruction behaviour for a given instruction address based on a selected portion of a selected local history record stored in the history storage circuitry;
where the selected local history record is selected based on the given instruction address, and the selected portion is selected based on the shared pointer.

* * * * *